United States Patent
Oh et al.

(10) Patent No.: US 7,392,012 B2
(45) Date of Patent: Jun. 24, 2008

(54) APPARATUS AND METHOD FOR RECEIVING SIGNAL IN A MULTIPLE-INPUT MULTIPLE-OUTPUT COMMUNICATION SYSTEM

(75) Inventors: Hyun-Seok Oh, Incheon (KR); Hyun-Seok Yu, Seoul (KR); Hye-Jeong Lee, Suwon-si (KR); Gin-Kyu Choi, Seoul (KR); Yong-Suk Moon, Suwon-si (KR); Hyun-Bae Lee, Suwon-si (KR); Young-Seok Lim, Seoul (KR)

(73) Assignee: Samsung Electronics Co., Ltd., Suwon Si (KR)

( * ) Notice: Subject to any disclaimer, the term of this patent is extended or adjusted under 35 U.S.C. 154(b) by 409 days.

(21) Appl. No.: 11/047,766

(22) Filed: Feb. 2, 2005

(65) Prior Publication Data

US 2005/0170802 A1 Aug. 4, 2005

(30) Foreign Application Priority Data

Feb. 2, 2004 (KR) .................... 10-2004-0006653

(51) Int. Cl.
*H04M 1/00* (2006.01)
*H04B 17/02* (2006.01)
(52) U.S. Cl. ................. 455/39; 455/101; 455/562.1; 455/132; 375/229
(58) Field of Classification Search ......... 455/132–140, 455/553.1, 562.1, 101, 67.13, 226.3; 375/229–234, 375/326, 341
See application file for complete search history.

(56) References Cited

U.S. PATENT DOCUMENTS 7,016,658 B2 * 3/2006 Kim et al. .................... 455/102
7,091,854 B1 * 8/2006 Miao ...................... 340/539.26

(Continued)

FOREIGN PATENT DOCUMENTS

JP 2003-134094 5/2003

(Continued)

OTHER PUBLICATIONS

Young-Ho Jung et al. "Adaptive CMMSE Receivers for Space-Time Block Coded MIMO CDMA System," *IEEE Magazine* Sep. 2002 Vancouver, Canada.

(Continued)

*Primary Examiner*—Simon Nguyen
(74) *Attorney, Agent, or Firm*—Roylance, Abrams, Berdo & Goodman, LLP

(57) ABSTRACT

An apparatus and method for receiving a signal in a MIMO communication system are provided. In the signal receiving method, a first received signal received at each of the receive antennas is equalized in a predetermined first method. Each of the equalized transmit antenna signals is despread with a plurality of spreading codes used in a transmitter. The strongest transmit antenna signal is detected among the despread transmit antenna signals, and decoded in a predetermined second method, for error verification. The verified strongest transmit antenna signal is reproduced as an interference signal. A second received signal is generated by subtracting the interference signal from the first received signal and equalized in the first method. The above operation is repeated on the equalized transmit antenna signals except the strongest transmit antenna signal.

9 Claims, 6 Drawing Sheets

U.S. PATENT DOCUMENTS

| | | |
|---|---|---|
| 2002/0060999 A1* | 5/2002 | Ma et al. .................... 370/335 |
| 2003/0016640 A1* | 1/2003 | Onggosanusi et al. ....... 370/335 |
| 2003/0026345 A1* | 2/2003 | Muharemovic et al. ..... 375/260 |
| 2003/0076908 A1* | 4/2003 | Huang et al. ................ 375/350 |
| 2004/0001426 A1* | 1/2004 | Mailaender et al. ......... 370/203 |
| 2004/0076224 A1* | 4/2004 | Onggosanusi et al. ....... 375/144 |
| 2004/0120274 A1* | 6/2004 | Petre et al. .................. 370/320 |
| 2005/0053172 A1* | 3/2005 | Heikkila ..................... 375/333 |
| 2005/0100052 A1* | 5/2005 | Mailaender et al. ......... 370/479 |
| 2006/0274844 A1* | 12/2006 | Walton et al. ............... 375/260 |

FOREIGN PATENT DOCUMENTS

| | | |
|---|---|---|
| WO | WO 02/093784 | 11/2002 |
| WO | WO 03/093784 | 11/2002 |

OTHER PUBLICATIONS

Takumi Ito et al., MF and MMSE Combined Iterative Soft Interference Canceller for MIMO/OFDM Systems, vol. 102, No. 674, Institute of Electronics, Information and Communication Engineers, Mar. 2003, pp. 117-224.

Ben Lu et al., Performance Analysis and Design Optimization of LDPC Coded MIMO OFDM Systems, Globecom 2003, vol. 3, pp. 1316-1320, 2003 IEEE.

* cited by examiner

APPARATUS AND METHOD FOR RECEIVING SIGNAL IN A MULTIPLE-INPUT MULTIPLE-OUTPUT COMMUNICATION SYSTEM

PRIORITY

This application claims the benefit under 35 U.S.C. §119 (a) to an application entitled "Apparatus and Method for Receiving Signal in a Multiple-Input Multiple-Output Communication System" filed in the Korean Intellectual Property Office on Feb. 2, 2004 and assigned Serial No. 2004-6653, the entire contents of which are incorporated herein by reference.

BACKGROUND OF THE INVENTION

1. Field of the Invention

The present invention relates generally to a communication system. In particular, the present invention relates to a signal receiving apparatus and method in a MIMO (Multiple-Input Multiple-Output) Communication System.

2. Description of the Related Art

Typically, a transmitted radio-frequency signal is distorted due to a variety of factors including multipath interference shadowing, propagation attenuation, time-varying noise, and interference in the radio channel environment of mobile communication systems, in comparison to signals transmitted in the wired channel environment. Fading caused by the multipath interference is closely related to reflectors or the mobility of a user, that is, a user terminal, and the actual transmitted signal that is mixed with the interference signal in a received signal. Thus, the received signal is a transmitted signal with severe distortion, which degrades the whole performance of the mobile communication system. Consequently, since the fading phenomenon may distort the amplitude and phase of the received signal, it is a major factor that hinders high-speed data communication in the radio frequency channel environment. Hence, signal fading has been an active area of study. High-speed data transmission in the mobile communication system requires minimizing the losses inherent to radio channels such as fading, and interference between users. As an approach to preventing fading-incurred unstable communications, diversity schemes are used. One of many diversity schemes is space diversity scheme that uses multiple antennas. The space diversity scheme is branched into a receive diversity, a transmit antenna diversity, and a MIMO. The receive antenna diversity is achieved by use of a plurality of receive antennas and the transmit antenna diversity is achieved by use of a plurality of transmit antennas. MIMO is a scheme for using a plurality of receive antennas and a plurality of transmit antennas.

A MIMO communication system uses multiple antennas in each transmitter (such as Node B) and a receiver (such as user equipment (UE)). The MIMO scheme is suitable for transmission of a large amount of data in a future-generation mobile communication system. Thus, the MIMO scheme is being actively studied. If the channels between the transmit antennas and the receive antennas are independent identically distributed (IID) ones, the number of transmit and receive antennas M are equal, and the bandwidth and transmit power are constant, the MIMO scheme has an average channel capacity about M times as large as that of a Single-Input Single-Output (SISO) scheme, thereby bringing a high gain in channel capacity. Use of the same spreading code for different transmit antennas in the MIMO communication system enables code reuse and, as a result, produces a gain in the data rate as compared to the SISO scheme.

A major example of a MIMO communication system is a Per-Antenna Rate Control (PARC) communication system. With reference to FIGS. 1 and 2, the PARC communication system will now be described.

FIG. 1 is a block diagram of a transmitter in a typical PARC communication system.

Before describing FIG. 1, it is assumed that the transmitter uses M transmit antennas and J spreading codes, wherein M and J are both integers. Thus, the transmitter can transmit M×J user data streams simultaneously.

Referring to FIG. 1, a user data stream to be transmitted is provided first to a demultiplexer (DEMUX) 100. The DEMUX 100 demultiplexes the user data stream in correspondence with the number of the transmit antennas, M. Specifically, the DEMUX 100 separates the user data stream into M user data streams and provides the first to $M^{th}$ user data streams sequentially to the first to the $M^{th}$ signal processors 110 to 114 in a one-to-one correspondence.

The first to $M^{th}$ signal processors 110 to 114 each include an encoder, an interleaver and a modulator. They encode their input user data streams according to a predetermined coding method that interleaves the coded data according to a predetermined interleaving method, and modulates the interleaved data according to predetermined modulation method. The outputs of the first to $M^{th}$ signal processors 110 to 114 each are provided to corresponding spreaders in first to $j^{th}$ spreading units 120 to 124. Each spreading unit includes M spreaders. That is, the first spreading unit 120 includes M spreaders, which receive signals from the first to $M^{th}$ signal processors 110 to 114, respectively, multiply the received signals by a first spreading code (SC1), and provide the products to first to $M^{th}$ adders 130 to 134, respectively. In this way, the $J^{th}$ spreading unit 124 includes M spreaders, which receive signals from the first to $M^{th}$ signal processors 110 to 114, respectively, multiply the received signals by a $J^{th}$ spreading code (SCJ), and provide the products to the first to $M^{th}$ adders 130 to 134, respectively. Consequently, the spread signals that were processed in the same signal processor are output to the same adder.

The first to $M^{th}$ adders 130 to 134 add the received signals and output them to the first to the $M^{th}$ transmit antennas 140 to 144 (Tx. ANT 1 to Tx. ANT M), respectively.

While not shown in FIG. 1, the outputs of the first to $M^{th}$ adders 130 to 134 are subject to additional signal processing including scrambling, digital-to-analog conversion, and filtering to be transmittable over the air, before being provided to the transmit antennas 140 to 144. Let the signals fed to the transmit antennas 140 to 144 be denoted by $s_1(t), s_2(t), \ldots, s_M(t)$.

As described above, the PARC communication system spreads a user data stream with a plurality of spreading codes and transmits the spread signals through transmit antennas. The plurality of spreading codes are applied commonly to each of the transmit antennas, thereby achieving effective code reuse and increasing resource efficiency.

The MIMO communication system that is being studied only takes into account a flat fading channel environment. Hence, many PARC receiver structures have only been proposed for the flat fading channel environment. The proposed PARC receiver structures include Minimum Mean Square Error (MMSE) and Successive Interference Cancellation (MMSE-SIC), which is a combination of MMSE and SIC.

Now a description will be made of the SIC scheme.

Typically, interference cancellation (IC) is a scheme for generating an interference signal and canceling the interference signal at a receiver. Here, the interference signal is considered to be the remaining signal of a received signal except for the desired signal to be detected.

There are two IC schemes: SIC and Parallel Interference Cancellation (PIC). The SIC scheme is further divided into decision-feedback and Bell Labs Layered Space-Time (BLAST). In the SIC scheme, signals are detected from a received signal in a descending order of signal strength. Specifically, the strongest signal, that is, the most interfering signal is first cancelled from the received signal using its hard-decision value. Then the next most interfering signal is cancelled from the remaining signal using its hard-decision value. By repeating this procedure, a final desired signal is detected.

As described above, the SIC scheme relies much upon the previous estimation. If errors are involved in the previous estimation, interference increases significantly, degrading performance. That is, as errors are generated in the estimate of a stronger signal, the performance degradation becomes more serious.

A variety of methods for solving the problem have been proposed. Among them, there are Partial SIC (PSIC), parallel detection, and sphere detection. According to the PSIC scheme, only a fraction of the strongest signal is cancelled from a received signal. If the ratio of the strongest signal is 1, the ratio of the fraction is between 0 and 1. The parallel detection scheme applies Maximum Likelihood (ML) Detection only to the transmit antenna that has transmitted the strongest signal, thereby increasing the reliability of the strongest signal. The sphere detection scheme generates a sphere having an appropriate radius from the most probable closes point on a constellation and estimates symbols within the sphere by ML detection.

For application to a PARC receiver, the MMSE-SIC performs better than the MMSE. Now, the PARC receiver will be described with reference to FIG. 2.

FIG. 2 is a block diagram of a receiver in the typical PARC communication system.

Before describing FIG. 2, it is assumed that the receiver uses N receive antennas and J spreading codes. While the number of the transmit antennas may be equal to that of the receive antennas, it is assumed that they are different as illustrated in FIG. 2. Referring to FIG. 2, first to $N^{th}$ receive antennas 200 to 204 (Rx. ANT 1 to Rx. ANT N) each receive signals from all the transmit antennas 140 to 144 illustrated in FIG. 1.

The first to $N^{th}$ receive antennas 200 to 204 provide the received signals to their corresponding despreaders 220 to 228. Specifically, the first receive antenna 200 outputs its received signal to $(1-1)^{th}$ to $(1-J)^{th}$ spreaders 220 to 222, the second receive antenna 202 outputs its received signal to $(2-1)^{th}$ to $(2-J)^{th}$ spreaders 223 to 225, and so on in this manner, until the Nth receive antenna 204 outputs its received signal to $(N,1)^{th}$ to $(N,J)^{th}$ spreaders 226 to 228, respectively.

The $(1-1)^{th}$ to $(1-J)^{th}$ despreaders 220 to 222 despread the signal received from the first receive antenna 200 with the same J spreading codes as used in the transmitter and output the despread signals to first to $J^{th}$ MMSE receivers 230 to 234, respectively. Specifically, the $(1-1)^{th}$ despreader 220 despreads the received signal with SC1 and outputs the despread signal to the first MMSE receiver 230, and the $(1-2)^{th}$ despreader 221 despreads the received signal with SC2 and outputs the despread signal to the second MMSE receiver 232. In the same manner, the $(1-J)^{th}$ despreader 222 despreads the received signal with SCJ and outputs the despread signal to the $J^{th}$ MMSE receiver 234.

The $(2-1)^{th}$ to $(2-J)^{th}$ despreaders 223 to 225 despread the signal received from the second receive antenna 202 with the same J spreading codes as used in the transmitter and output the despread signals to the first to $J^{th}$ MMSE receivers 230 to 234, respectively. Specifically, the $(2-1)^{th}$ despreader 223 despreads the received signal with SC1 and outputs the despread signal to the first MMSE receiver 230, and the $(2-2)^{th}$ despreader 224 despreads the received signal with SC2 and outputs the despread signal to the second MMSE receiver 232. In the same manner, the $(2-J)^{th}$ despreader 225 despreads the received signal with SCJ and outputs the despread signal to the $J^{th}$ MMSE receiver 234.

In this way, the $(N-1)^{th}$ to $(N-J)^{th}$ despreaders 226 to 228 despread the signal received from the $N^{th}$ receive antenna 204 with the same J spreading codes as used in the transmitter and output the despread signals to the first to $J^{th}$ MMSE receivers 230 to 234, respectively. Specifically, the $(N,1)^{th}$ despreader 226 despreads the received signal with SC1 and outputs the despread signal to the first MMSE receiver 230, and the $(N-2)^{th}$ despreader 227 despreads the received signal with SC2 and outputs the despread signal to the second MMSE receiver 232. In the same manner, the $(N-J)^{th}$ despreader 228 despreads the received signal with SCJ and outputs the despread signal to the $J^{th}$ MMSE receiver 234.

The first to $J^{th}$ MMSE receivers 234 each detect a corresponding user data stream from the received signals by MMSE. Specifically, the first MMSE receiver 230 detects a user data stream from the signals received from the $(1-1)^{th}$, $(2-1)^{th}$, ..., $(N-1)^{th}$ despreaders 220, 223, ..., 226 by MMSE, the second MMSE receiver 232 detects a user data stream from the signals received from the $(1-2)^{th}$, $(2-2)^{th}$, ..., $(N-2)^{th}$ despreaders 221, 224, ..., 227 by MMSE, and in the same manner, the $J^{th}$ MMSE receiver 234 detects a user data stream from the signals received from the $(I-J)^{th}$, $(2-J)^{th}$, ..., $(N-J)^{th}$ despreaders 222, 225, ..., 228 by MMSE. Consequently, each of the first to $J^{th}$ MMSE receivers 230 to 234, respectively, receives the signals despread with the same spreading code.

A multiplexer (MUX) 240 multiplexes the signals received from the first to $J^{th}$ MMSE receivers 230 to 234, respectively. A signal processor 250, including a decoder, a deinterleaver, and a demodulator, decodes the multiplexed signal in a decoding method corresponding to the coding, deinterleaves the decoded signal in a deinterleaving method corresponding to the interleaving, and demodulates the deinterleaved signal in a demodulation method corresponding to the modulation in the transmitter. It is assumed herein that the signal processor 250 sequentially detects the user data streams transmitted from the first to $M^{th}$ transmit antennas 140 to 144, respectively. The signal processor 250 outputs a user data stream having the highest signal strength to a signal reproducer 260. The signal strength is a measure of Signal to Interference and Noise Ratio (SINR). For conciseness, it is assumed that the user data streams are stronger in the order of the $M^{th}$ transmit antenna 144< ... < the second transmit antenna 142<the first transmit antenna 140.

The signal reproducer 260 reconstructs an original transmitted signal by processing the signal from the signal processor 250, that is, the user data stream transmitted by the first transmit antenna 140 in the manner of the signal processing in the transmitter, and outputs the reconstructed signal to first to Nth subtractors 210 to 214. The signal reproducer 260 includes an encoder, an interleaver, and a modulator, which encodes the received signal in a predetermined coding method, interleaves the coded signal in a predetermined interleaving method, and modulates the interleaved signal in the modulation method of the transmitter.

The first subtractor 210 subtracts the reproduced signal from the signal received through the first receive antenna 200 and outputs the resulting signal to the $(1\text{-}1)^{th}$ to $(1\text{-}J)^{th}$ despreaders 220 to 222. The second subtractor 212 subtracts the reproduced signal from the signal received through the second receive antenna 200 and outputs the resulting signal to the $(2\text{-}1)^{th}$ to $(2\text{-}J)^{th}$ despreaders 223 to 225, respectively. In the same manner, the $N^{th}$ subtractor 214 subtracts the reproduced signal from the signal received through the $N^{th}$ receive antenna 204 and outputs the resulting signal to the $(N\text{-}1)^{th}$ to $(N\text{-}J)^{th}$ despreaders 226 to 228, respectively.

The above operation is repeatedly performed on the strongest to weakest user data streams. Thus, the receiver accurately detects the user data stream transmitted by the transmitter, while sequentially reducing the effects of the multiple transmit antennas in the PARC communication system.

Meanwhile, the real radio channel environment is similar to a frequency-selective fading channel environment, and a spatial channel model (SCM) under consideration in the MIMO communication system takes into account six paths. As described earlier, however, the current study of the MIMO communication system is confined to the fading channel environment. Therefore, there is a need for a MIMO communication system that is implemented under the real radio channel environment such as the frequency-selective fading channel environment.

SUMMARY OF THE INVENTION

An object of the present invention is to substantially solve at least the above problems and/or disadvantages and to provide at least the advantages below. Accordingly, an object of the present invention is to provide an apparatus and method for receiving a signal, taking into account a frequency-selective fading channel environment in a MIMO communication system.

Another object of the present invention is to provide a signal receiving apparatus and method using an MMSE-SIC scheme in a MIMO communication system.

The above object is achieved by providing a signal receiving apparatus and method in a MIMO communication system.

According to one aspect of the present invention, in a method of receiving a signal from a transmitter through a plurality of transmit antennas in a receiver with a plurality of receive antennas in a MIMO communication system, the receiver equalizes a first received signal received at each of the receive antennas in a predetermined first method and classifies the equalized signals into respective transmit antenna signals. The method despreads each of the equalized transmit antenna signals with a plurality of spreading codes used in the transmitter. Then, the receiver detects the strongest transmit antenna signal among the despread transmit antenna signals, and verifies errors in the strongest transmit antenna signal by decoding the strongest transmit antenna signal in a predetermined second method. The receiver reproduces the verified strongest transmit antenna signal as an interference signal and generates a second received signal by subtracting the interference signal from the first received signal. The receiver equalizes the second received signal in the first method and classifies the equalized signals into respective transmit antenna signals except for the strongest transmit antenna signal. Then, the steps of the method are repeated until all of the received signals have been equalized.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail for the sake of conciseness.

Figure 1:
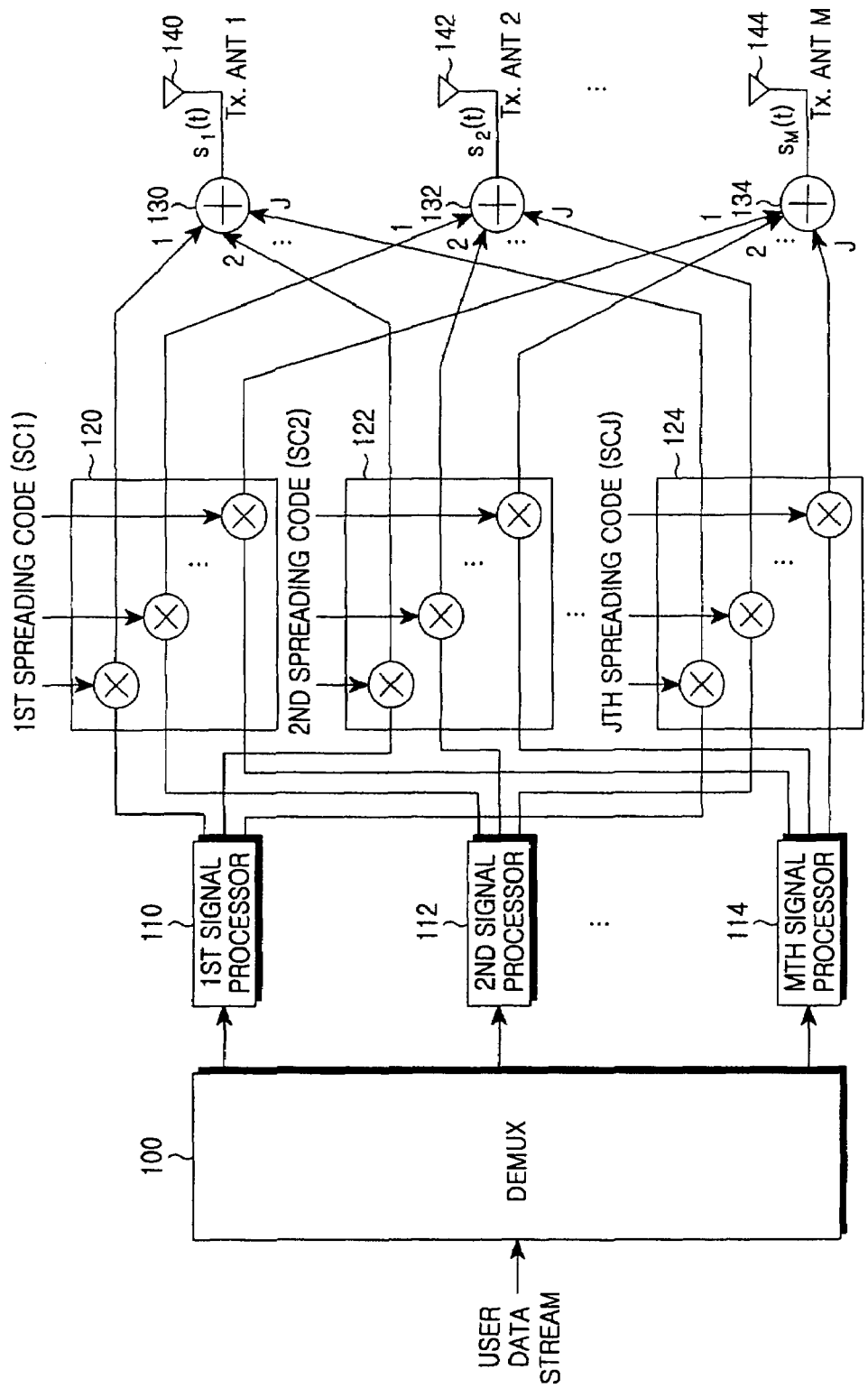
FIG. 1 is a block diagram of a transmitter in a conventional PARC communication system.
Figure 2:
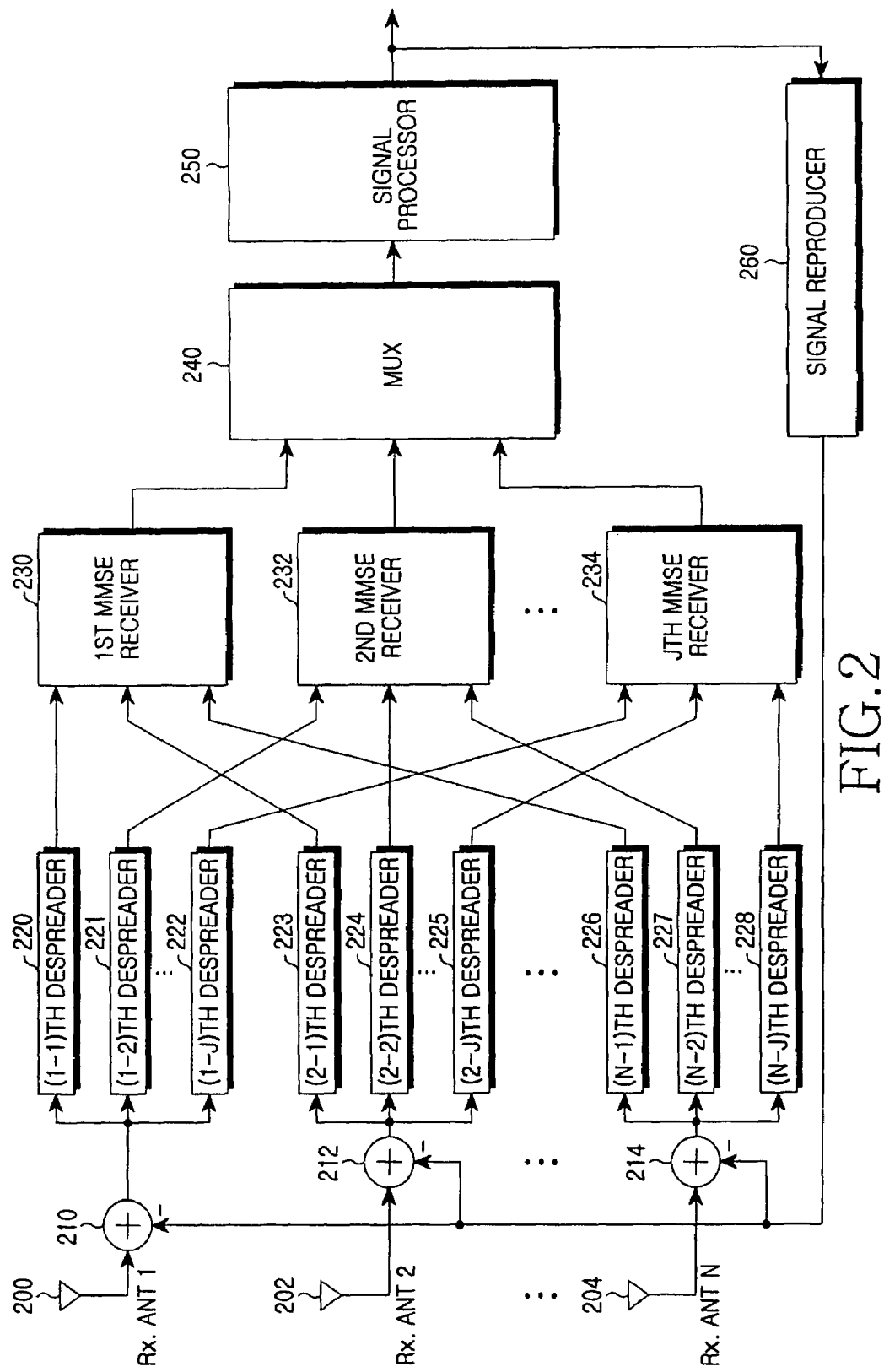
FIG. 2 is a block diagram of a receiver in the conventional PARC communication system.

It is assumed that a MIMO communication system of an embodiment of the present invention has a transmitter configured in the same manner as the conventional PARC transmitter illustrated in FIG. 1. That is, the transmitter transmits a user data stream using M transmit antennas and J spreading codes.

As described before, the current study of MIMO communication systems is confined to a fading channel environment. However, a real radio channel environment is close to a frequency-selective fading channel environment, and an SCM under consideration in the MIMO communication system takes into account six paths. Therefore, it is assumed that the signal transmitted from the transmitter in the MIMO communication system of the embodiment of the present invention experiences a frequency-selective fading channel. Consequently, a receiver for the MIMO communication system is newly configured so as to receive such a signal under the frequency-selective fading channel environment in the MIMO communication system.

A description will first be made of the signal transmitted by the transmitter of the MIMO communication system, that is, the transmitter of the conventional PARC communication system illustrated in FIG. 1.

As described before with reference to FIG. 1, the transmitter demultiplexes a user data stream for transmission according to a data rate. The demultiplexed user data streams are subject to signal processing. Specifically, they are encoded according to a predetermined coding method, interleaved according to a predetermined interleaving method, and modulated according to a predetermined modulation method. The processed signals are spread with J spreading codes and transmitted at the data rate through M transmit antennas. The data rate, the coding method, and the modulation method are determined based on channel quality information (CQI) fed back from the receiver. The CQI can be the SINRs of the M transmit antennas, for example. Since the J spreading codes are applied commonly to each of the M transmit antennas, the code reuse increases the resource efficiency.

Let the signal transmitted from the M transmit antennas be denoted by s(t). s(t) is preferably a combination of signals transmitted from the respective first to Mth transmit antennas, $s_1(t), s_2(t), \ldots, s_M(t)$.

$$s(t)=[s_1(t) s_2(t) \ldots s_M(t)]^T \quad \text{Eq. (1)}$$

where T is a matrix transpose operator.

It is assumed that the J spreading codes have a spreading factor SF, and an arbitrary $j^{th}$ spreading code $c_j[k]$ (wherein $k=1, 2, \ldots, SF$) that is orthogonal to any other spreading code and normalized.

The transmitter can transmit M×J user data streams for one symbol period. Let a $j^{th}$ symbol transmitted from an $m^{th}$ transmit antenna be denoted by $b_{jm}^-$ (wherein $m=1, 2, \ldots, M$ and $j=1, 2, \ldots, J$), and the orthogonal, normalized J spreading codes with an SF be denoted by $C=[c_1 c_2 \ldots c_j]$. Using the spreading codes, the user data stream is converted to a chip level signal. Hence, a $k^{th}$ chip signal $s_m(k)$ from the $m^{th}$ transmit antenna is expressed as $$s_m(k) = \sum_{j=1}^{j} c_j(k) b_{jm}, \, m = 1, 2, \ldots, M \quad \text{Eq. (2)}$$

If an equalizer length, which is expressed in units of chips taking into account the fading-selective channel environment, is E, Eq. (2) is equivalent to $$s_m(k)=[s_m(k), s_m(k+1), \ldots, s_m(k+E+L-2)]^T \quad \text{Eq. (3)}$$

where L is the number of signal paths.

Figure 3:
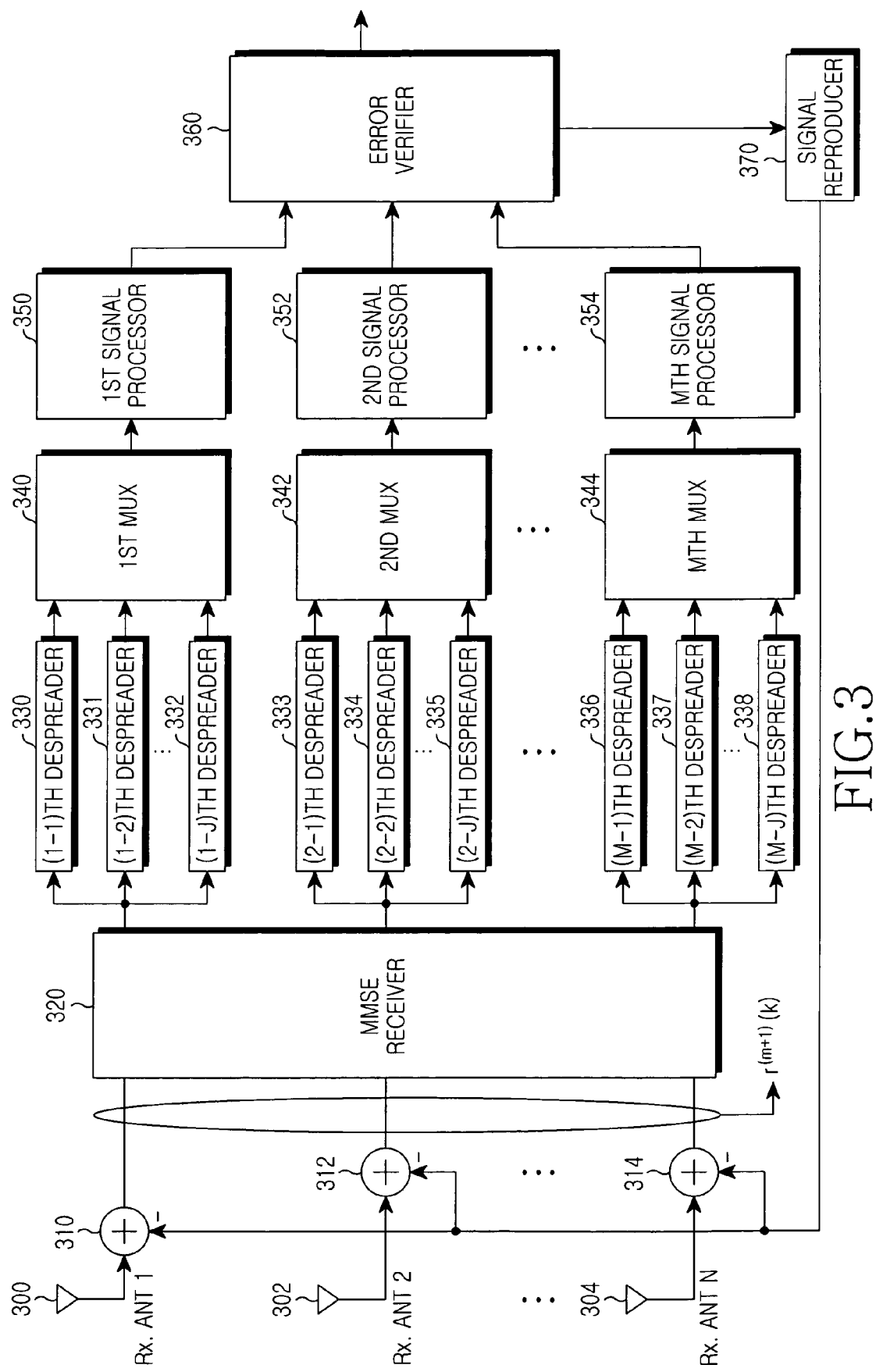
FIG. 3 is a block diagram of a receiver in a MIMO communication system according to an embodiment of the present invention.

With reference to FIG. 3, a receiver structure in the MIMO communication system according to an embodiment of the present invention will now be described.

FIG. 3 is a block diagram of the receiver in the MIMO communication system according to the embodiment of the present invention.

Before describing FIG. 3, it is assumed that the receiver uses N receive antennas and J spreading codes. While the number of transmit antennas may be equal to that of the receive antennas, it is assumed that the numbers are different as illustrated in FIG. 3.

Referring to FIG. 3, the first to the $N^{th}$ receive antennas 300 to 304 (Rx. ANT 1 to Rx. ANT N) each receive signals from all the transmit antennas 140 to 144 illustrated in FIG. 1.

The first to $N^{th}$ receive antennas 300 to 304 provide the received signals to an MMSE receiver 320. At a first stage, the signals bypass first to $N^{th}$ subtractors 310 to 314, but at the following stages, signals output from the first to Nth subtractors 310 to 314 are provided to the MMSE receiver 320. Specifically, the signals received at the receive antennas 300 to 304 are directly passed to the MMSE receiver 320 at the first stage. At the following stages, the received signals are fed to the subtractors 310 to 314, respectively. The subtractors 310 to 314 subtract a reproduced signal received form a signal reproducer 370 from the received signals and provide the resulting signals to the MMSE receiver 320. An arbitrary $k^{th}$ chip signal received at an arbitrary $n^{th}$ receive antennas is represented by $r_n(k)$.

The received signal at the receiver in the MIMO communication system will be described below.

The radio channel between the transmitter and the receiver is a frequency-selective fading channel and the characteristic of the frequency-selective fading channel is represented by H. The chip level signals received at the N receive antennas on the frequency-selective fading channel are expressed as $$r(k) = \sum_{m=1}^{M} H(;m) s_m(k) + n(k) = Hs(k) + n(k) \quad \text{Eq. (4)}$$

$$\begin{bmatrix} r_1(k) \\ r_2(k) \\ \vdots \\ r_N(k) \end{bmatrix} = \begin{bmatrix} H_{11} & H_{12} & \cdots & H_{1M} \\ H_{21} & H_{22} & \cdots & H_{2M} \\ \vdots & \vdots & \ddots & \vdots \\ H_{N1} & H_{N2} & \cdots & H_{NM} \end{bmatrix} \begin{bmatrix} s_1(k) \\ s_2(k) \\ \vdots \\ s_M(k) \end{bmatrix} + \begin{bmatrix} n_1(k) \\ n_2(k) \\ \vdots \\ n_N(k) \end{bmatrix}$$

where $r(k)$ is a $k^{th}$ chip signal of the total received signal of the receiver, $s_m(k)$ is a $k^{th}$ transmitted signal from the $m^{th}$ transmit antenna, $n(k)$ is a noise vector added to the $k^{th}$ chip signal, and $H(;m)$ is a channel characteristic that the transmitted signal from the $m^{th}$ transmit antenna experiences before arriving at the $n^{th}$ receive antenna. Here, $H(;m)=[H_{1m} H_{2m} \ldots H_{Nm}]^T$. The channel matrix $H_{NM}$ representing the channel characteristic that the transmitted signal from the $m^{th}$ transmit antenna experiences before arriving at the $n^{th}$ receive antenna is $$H_{nm} = \begin{bmatrix} H^{(nm)} & 0 & \cdots & 0 \\ 0 & H^{(nm)} & \cdots & 0 \\ \vdots & \vdots & \ddots & \vdots \\ 0 & 0 & \cdots & H^{(nm)} \end{bmatrix} \quad \text{Eq. (5)}$$

where $H^{(NM)}$ is an element matrix of $H_{NM}$.

$$H^{(nm)} = \begin{bmatrix} h_{1,l-1}^{(nm)} & h_{1,l-2}^{(nm)} & \cdots & h_{1,0}^{(nm)} \\ h_{2,l-1}^{(nm)} & h_{2,l-2}^{(nm)} & \cdots & h_{2,0}^{(nm)} \\ \vdots & \vdots & \ddots & \vdots \\ h_{P,l-1}^{(nm)} & h_{P,l-2}^{(nm)} & \cdots & h_{P,0}^{(nm)} \end{bmatrix} \quad \text{Eq. (6)}$$

where P is the number of oversamples per chip.

And the received signal $r_n(k)$ is $$r_n(k)=[r_{n1}(k), r_{n2}(k), \ldots, r_{nP}(k), \ldots, r_{n1}(k+E-1), r_{n2}(k+E-1), \ldots, r_{nP}(k+E-1)]^T \quad \text{Eq. (7)}$$

The noise vector $n(k)$ is a complex Gaussian random variable with zero mean and variance $$\frac{\sigma_n^2}{2}.$$

$$n_n(k)=[n_{n1}(k), \ldots, n_{nP}(k), \ldots, n_{n1}(k+E-1), \ldots, n_{nP}(k+E-1)]^T \quad (8)$$

Meanwhile, the MMSE receiver 320 calculates weights for the first to $M^{th}$ transmit antennas 140 to 144 by MMSE and equalizes the signals transmitted from the transmit antennas 140 to 144 with the weights. Specifically, the MMSE receiver 320 applies the weight calculated for the first transmit antenna 140 to the first transmit antenna signal and provides the resulting signal to $(1-1)^{th}$ to $(1-J)^{th}$ despreaders 330 to 332, and applies the weight calculated for the second transmit antenna 142 to the second transmit antenna signal and provides the resulting signal to $(2-1)^{th}$ to $(2-J)^{th}$ despreaders 333 to 335, respectively. In this manner, the MMSE receiver 320 applies the weight calculated for the $M^{th}$ transmit antenna 144 to the $M^{th}$ transmit antenna signal and provides the resulting signal to $(M-1)^{th}$ to $(M-J)^{th}$ despreaders 336 to 338, respectively.

Thus, the output of the MMSE receiver 320 is $$w_{MMSE}=H^*(HH^*+\sigma_n^2 I_{PNE})^{-1}\cdot z_{MMSE}(k)=W_{MMSE}r(k) \quad \text{Eq. (9)}$$

where $W_{MMSE}$ denotes the weights calculated by MMSE for the first to $M^{th}$ transmit antennas 140 to 144. In Eq. (9) above, $W_{MMSE}$ is also equal to $[w_1\ w_2\ \ldots\ w_M]^T$, wherein $w_1$ is the weight for the first transmit antenna 140, $w_2$ is the weight for the second transmit antenna 142, and $w_M$ is the weight for the $M^{th}$ transmit antenna 144.

While the MMSE is used for equalization in the embodiment of the present invention, zero forcing (ZF) can be used instead of MMSE. In this case, the ZF-equalized signal of r(k) is $$W_{ZF}=H^*(HH^*)^{-1}, Z_{ZF}(k)=W_{ZF}r(k) \quad \text{Eq. (10)}$$

where $W_{ZF}$ denotes the weights calculated by ZF for the first to $M^{th}$ transmit antennas 140 to 144. In Eq. 10, $W_{ZF}=[w_1\ w_2\ \ldots\ w_M]^T$, wherein $w_1$ is the weight for the first transmit antenna 140, $w_2$ is the weight for the second transmit antenna 142, and $w_M$ is the weight for the $M^{th}$ transmit antenna 144.

The $(1-1)^{th}$ to $(1-J)^{th}$ despreaders 330 to 332 despread the signal received from the MMSE receiver 320 with the same J spreading codes as used in the transmitter and output the despreaded signals to a first MUX 340. The $(2-1)^{th}$ to $(2-J)^{th}$ despreaders 333 to 335 despread the signal received from the MMSE receiver 320 with the J spreading codes and output the despreaded signals to a second MUX 342. In the same manner, the $(M-1)^{th}$ to $(M-J)^{th}$ despreaders 336 to 338 despread the signal received from the MMSE receiver 320 with the J spreading codes and output the despreaded signals to an $M^{th}$ MUX 344. After the dispreading, the chip level signals are converted to symbol level signals.

The first MUX 340 multiplexes the signals received from the $(1-1)^{th}$ to $(1-J)^{th}$ despreaders 330 to 332, the second MUX 342 multiplexes the signals received from the $(2-1)^{th}$ to $(2-J)^{th}$ despreaders 333 to 335, and in this manner, the last $M^{th}$ MUX 344 multiplexes the signals received from the $(M-1)^{th}$ to $(M-J)^{th}$ despreaders 336 to 338.

Each of the first to $M^{th}$ signal processors 350 to 354 has a decoder, a deinterleaver and a demodulator. The first signal processor 350 decodes, deinterleaves, and demodulates the signal received from the first MUX 340 in decoding, deinterleaving, and demodulation methods corresponding to the coding, interleaving and modulation methods of the transmitter. The second signal processor 352 decodes, deinterleaves, and demodulates the signal received from the second MUX 342 in the decoding, deinterleaving, and demodulation methods. In this way, the $M^{th}$ signal processor 354 decodes, deinterleaves, and demodulates the signal received from the $M^{th}$ MUX 344 in the decoding, deinterleaving, and demodulation methods. An error verifier 360 receives the processed signals from the first to $M^{th}$ signal processor 350 to 354.

The input signal of the error verifier 360 is the estimate $\tilde{b}_{jm}$ of a symbol $b_{jm}$ transmitted from the transmitter.

As described earlier, the receiver in the MIMO communication system according to an embodiment of the present invention adopts the MMSE-SIC scheme. SIC is a scheme of first canceling the strongest signal, that is, the most interfering signal from the received signal using its hard-decision value and then the next most interfering signal from the remaining signal using its hard-decision value, and detecting a final desired signal by repeating this procedure. The signal strength can be the measured SINR or other similar signal strength measurement. Since the SIC scheme is used, the interfering signals are generated in descending order of the SINR. The SINR is calculated using the equalizer matrix of the MMSE receiver 320 illustrated in Eq. (9) and the channel matrix by $$SINR_m = \frac{|w_m \Gamma_{m,1}|^2}{\sum_{i=1,i\neq m}^{M}\sum_{j=1}^{E+L-1}|w_m\Gamma_{i,j}|^2 + \sum_{j=2}^{E+L-1}|w_m\Gamma_{m,j}|^2 + Mw_m R_n w_m^H} \quad \text{Eq. (11)}$$

where $\Gamma=H(;m)^\Gamma=[\Gamma_{1,1}\Gamma_{1,2}\ \ldots\ \Gamma_{1,E+L-1}\ \Gamma_{M,1}\Gamma_{M,2}\ \ldots\ \Gamma_{M,E+L-1}]$, $R_n$ is a correlation matrix with respect to the noise vector, and $SINR_m$ is the SINR of an $m^{th}$ transmit antenna signal.

It is assumed that the SINRs are stronger in the order of the $M^{th}$ transmit antenna 144< ... <the second transmit antenna 142<the first transmit antenna 140 ($SINR_1 \leq SINR_2 \leq \ldots \leq SINR_M$).

That is, the signal from the first transmit antenna 140 is first cancelled, and then the signal from the second transmit antenna 142 is cancelled and so on. As described in the Description of the Related Art, the SIC scheme very much depends on the previous detected estimate. If symbols are falsely detected in the previous stage, interference significantly increases, thereby degrading performance.

In accordance with an embodiment of the preset invention, the reliability of the interference signal is improved before canceling the interference signal in order to circumvent the performance degradation encountered with the SIC scheme. The error verifier 360 eventually takes charge of the operation of improving the reliability of the interference signal. Improving the reliability of the interference signal amounts to improving the reliability of a transmit antenna signal having the highest SINR.

The closest symbol constellation points to the symbols with index j (j=1, 2, ..., J) from the highest SINR-transmit antenna are sequentially detected among all signal constellation points of modulation given by $\Phi=\{v_1, v_2, \ldots, v_Q\}$ by ML detection in an interference cancellation process and then constellation points with a minimum error norm are computed by MMSE. These estimated symbols are input to the error verifier 360. The chip level signals output from the first to $M^{th}$ signal processors 350 to 354, that is, final signals input to the error verifier 360 are expressed as $$\tilde{b} = \begin{bmatrix} \tilde{b}_{11} & \tilde{b}_{21} & \cdots & \tilde{b}_{J1} \\ \tilde{b}_{12} & \tilde{b}_{22} & \cdots & \tilde{b}_{J2} \\ \vdots & \vdots & \vdots & \vdots \\ \tilde{b}_{1M} & \tilde{b}_{2M} & \cdots & \tilde{b}_{JM} \end{bmatrix} \quad \text{Eq. (12)}$$

where $\tilde{b}$ represents the estimated symbols from the first to $M^{th}$ transmit antennas 140 to 144 and $\tilde{b}_{jm}$ represents the estimate of a $j^{th}$ symbol transmitted from the $m^{th}$ transmit antenna.

It is assumed that each of the J spreading codes modulates data in a modulation scheme with Q constellation points in the transmitter of the MIMO communication system. It is also assumed that the estimate of a received signal in the receiver is a constellation point with a minimum distance between the despread signal and the signal modulated in the modulation scheme and transmitted by the transmitter. Then, the transmit antenna symbols transmitted from the M transmit antennas are $$b = \begin{bmatrix} b_{11} & b_{12} & \cdots & b_{1J} \\ b_{21} & b_{22} & \cdots & b_{2J} \\ \vdots & \vdots & \ddots & \vdots \\ b_{M1} & b_{M2} & \cdots & b_{MJ} \end{bmatrix} = [b_1 b_2 \ldots b_J], \quad \text{Eq. (13)}$$

$$b_{mj} \in \Phi = \{v_1, v_2, \ldots, v_Q\}$$

and ML-decoded by constellation point vector $x_j = [x_{1j} x_{2j} \ldots x_{Mj}]^T$, $x_{mj} \in \Phi$, $\Phi = \{v_1, v_2, \ldots, v_Q\}$ despreaded signal vector $z_j = [z_{1j} z_{2j} \ldots z_{Mj}]^T$ $$\varepsilon_i(z \mid x) = \|e_J(z \mid x)\| = \left\| z_j - \sqrt{\frac{\alpha^2}{M}} H x_j \right\|, \, j = 1, 2, \ldots, J \quad \text{Eq. (14)}$$

$$\hat{b}_j^{ML} = \min_{x \in \Phi} \varepsilon_j(z \mid x), \, j = 1, 2, \ldots, J$$

That is, Eq. (14) represents ML decoding of the symbols from all the M transmit antennas.

In the present invention, however, only the highest-SINR transmit antenna symbols acting as an interfering signal in the received signal are subject to ML decoding, thereby increasing the reliability of the transmit antenna symbols in the MMSE-SIC scheme.

For example, if M=4, J=8, and the SIC process is carried out in the order of m=1, 2, 3, 4, the estimated symbols of the received signal are $$\hat{b} = \begin{bmatrix} \hat{b}_{11} \hat{b}_{12} \hat{b}_{13} \hat{b}_{14} \hat{b}_{15} \hat{b}_{16} \hat{b}_{17} \hat{b}_{18} \\ \hat{b}_{21} \hat{b}_{22} \ldots \hat{b}_{2j} \ldots \hat{b}_{28} \\ \vdots \quad \vdots \quad \ddots \quad \vdots \\ \hat{b}_{41} \hat{b}_{42} \ldots \hat{b}_{Mj} \ldots \hat{b}_{48} \end{bmatrix} = [\hat{b}_1 \hat{b}_2 \ldots \hat{b}_8] \quad \text{Eq. (15)}$$

→ First pass, ML decoding

In the first pass, the symbols from the first transmit antenna having the highest SINR in the first row are ML-decoded. Sequentially, the symbols from up to the fourth transmit antenna are ML-decoded.

The error verifier 360 verifies errors in $\tilde{b}$ illustrated in Eq. (12) by $$e(b_{1j} = v_q) = r - HC\tilde{b}(b_{1j} = v_q), \, q = 1, 2, \ldots, Q \quad \text{Eq. (16)}$$

$$q_{\min}(j) = \min_{v_q \in \Phi} \xi(b_{1j} = v_q) = \min_{v_q \in \Phi} \|e(b_{1j} = v_q)\| \quad \text{Eq. (17)}$$

and $$\tilde{b}_{1j} = v_{q_{\min}(j)} \quad \text{Eq. (18)}$$

In the manner described above, the error verifier 360 performs an error verification process on the highest-SINR transmit antenna symbols (such as the first transmit antenna symbols) through ML decoding. The signal reproducer 370 reproduces a transmitted signal by processing the verified symbols in the same manner as used in the transmitter of the MIMO communication system, and provides the reproduced signal to the first to $N^{th}$ subtractors 310 to 314. The signal reproducer 370 comprises an encoder, an interleaver, and a modulator. Thus, it encodes, interleaves and modulates the verified symbols in the encoding, interleaving and modulation methods used in the transmitter.

The first subtractor 310 subtracts the reproduced signal from the signal received at the first receive antenna 300 and provides the resulting signal to the $(1\text{-}1)^{th}$ to $(I\text{-}J)^{th}$ despreaders 330 to 332. The second subtractor 312 subtracts the reproduced signal from the signal received at the second receive antenna 302 and provides the resulting signal to the $(2\text{-}1)^{th}$ to $(2\text{-}J)^{th}$ despreaders 333 to 335, respectively. In this manner, the $N^{th}$ subtractor 314 subtracts the reproduced signal from the signal received at the $N^{th}$ receive antenna 304 and provides the resulting signal to the $(M\text{-}1)^{th}$ to $(M\text{-}J)^{th}$ despreaders 336 to 338, respectively.

The above operation is repeated on the user data streams with the highest to lowest SINRs, so that the receiver accurately detects the user data streams transmitted by the transmitter, sequentially reducing the effects of the multiple transmit antennas.

The interference cancellation process is summarized as follows.

Step 1: The highest-SINR transmit antenna signal is detected and cancelled from the received signal.

If $r^{(1)}(k) = r(k)$, $H^{(1)} = H$, and $W^{(1)} = W_{MMSE}$, verified estimated symbols are assumed to be $\hat{b}^{(1)}$. The highest-SINR transmit antenna symbols are detected from $\hat{b}^{(1)}$ and reproduced. The reproduced symbols are cancelled from $r^{(1)}(k)$. The resulting signal $r^{(2)}(k)$ is given as $$r^{(2)}(k) = \sum_{m=1}^{M} H(;m) s_m(k) - H(;1) \hat{s}_1(k) + n(k) \quad \text{Eq. (19)}$$

Step 2: The second highest-SINR transmit antenna signal is detected.

Since the highest-SINR transmit antenna signal is cancelled from the received signal, that is, the channel component that the highest-SINR transmit antenna signal has experienced is cancelled from the channel matrix $H^{(1)}$, the channel matrix for the remaining signal $H^{(2)} = [H(;2) H(;3) \ldots H(;M)]$ has (M-1) channel components. In the same manner as Step 1, using MMSE for $r^{(2)}(k)$ leads to $$W^{(2)} = H^{(2)*}(H^{(2)}H^{(2)*} + \sigma_n^2 I_{PNE})^{-1} \quad \text{Eq. (20)}$$

$$z^{(2)} = W^{(2)} r^{(2)}(k) \quad \text{Eq. (21)}$$

A symbol vector $\hat{b}^{(2)}$ is computed by dispreading the MMSE-equalized signal $Z^{(2)}$ with every spreading code (j=1, 2, ..., J). The second chip level transmit antenna signal $\hat{s}_2(k)$ is then reproduced from $\hat{b}i^{(2)}$ and removed from $r^{(2)}(k)$. Thus, $$r^{(3)}(k) = \sum_{m=1}^{M} H(;m) s_m(k) - \sum_{j=1}^{2} H(;2) \hat{s}_2(k) + n(k) \quad \text{Eq. (22)}$$

Step 1 and Step 2 are performed on up to the last transmit antenna signal, thereby detecting all transmit antenna signals. This operation is generalized as $$r^{(m)}(k) = \sum_{m=1}^{M} H(;m)s_m(k) - \sum_{j=1}^{m-1} H(;j)\hat{s}_j(k) + n(k) \quad \text{Eq. (23)}$$

The receiver architecture in the MIMO communication system according to the embodiment of the present invention has been described. Now a description will be made of signal reception in the MIMO communication system with reference to FIG. 4.

Figure 4:
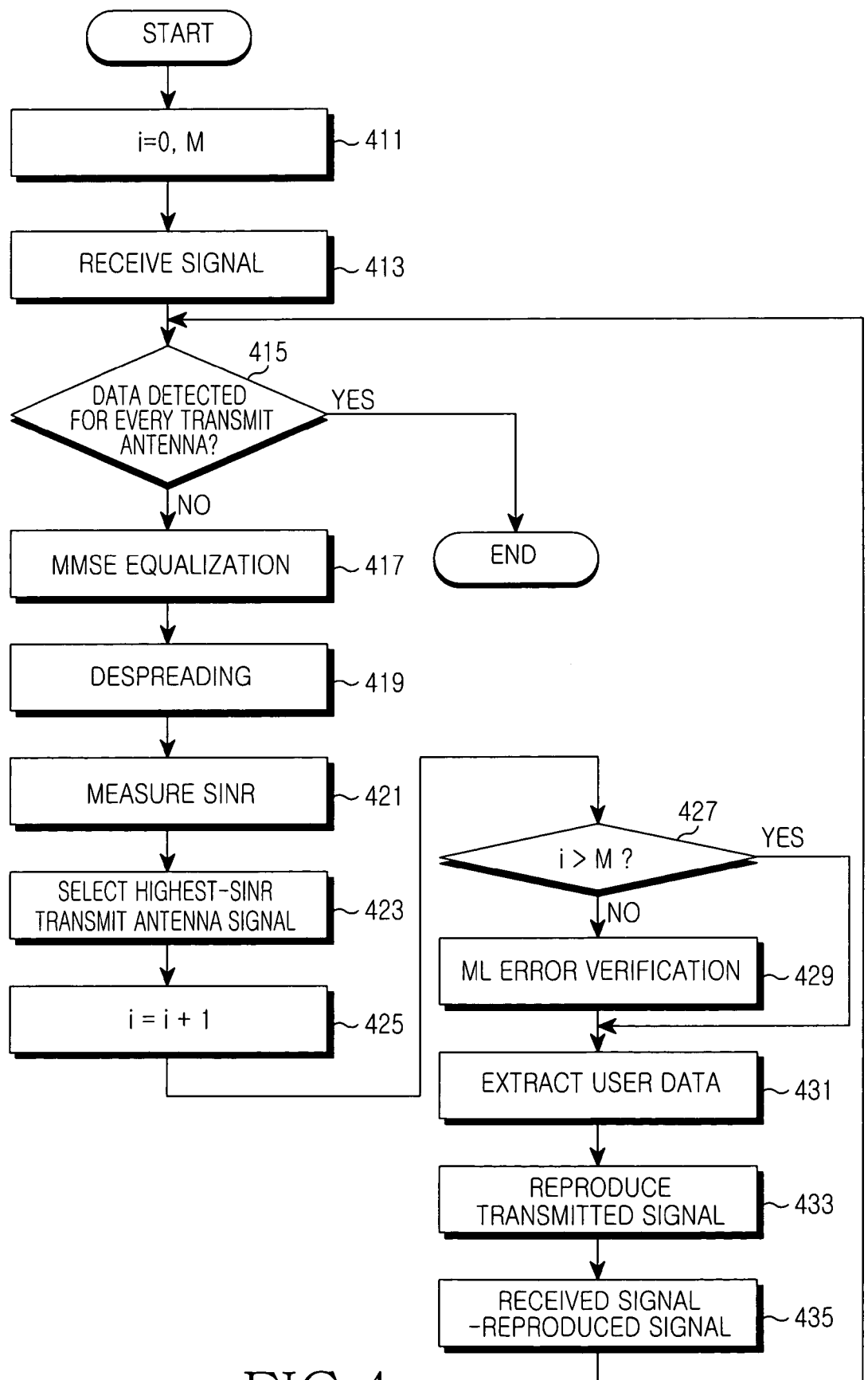
FIG. 4 is a flowchart illustrating signal reception in the receiver of the MIMO communication system according to the embodiment of the present invention.

FIG. 4 is a flowchart illustrating signal reception in the receiver in the MIMO communication system according to the embodiment of the present invention.

Referring to FIG. 4, the receiver sets a variable i representing the count of transmit signal detections to an initial value and sets the number of the transmit antennas, M in step 411. In step 413, the receiver receives signals from the M transmit antennas of the transmitter. The receiver determines whether user data has been completely detected for every transmit antenna in step 415. If the user data detection is completed, the receiver terminates the procedure. On the contrary, if the user data detection is not completed, the receiver goes to step 417.

The receiver equalizes the received signal by MMSE in step 417, despreads the equalized signal with J spreading codes in step 419, and measures the SINR of each transmit antenna signal in step 421. In step 423, the receiver selects a transmit antenna signal with the highest SINR. The receiver increments i by 1 (i=i+1) in step 425.

In step 427, the receiver compares i with M. If i exceeds M, the receiver jumps to step 431. If i is equal to or less than M, the receiver proceeds to step 429. The receiver verifies errors in the highest-SINR transmit antenna signal by an ML-type error criterion in step 429 and extracts user data from the verified transmit antenna signal in step 431. In step 433, the receiver reproduces a transmitted signal from the user data. The receiver removes the reproduced signal from the received signal in step 435 and returns to step 415.

Figure 5:
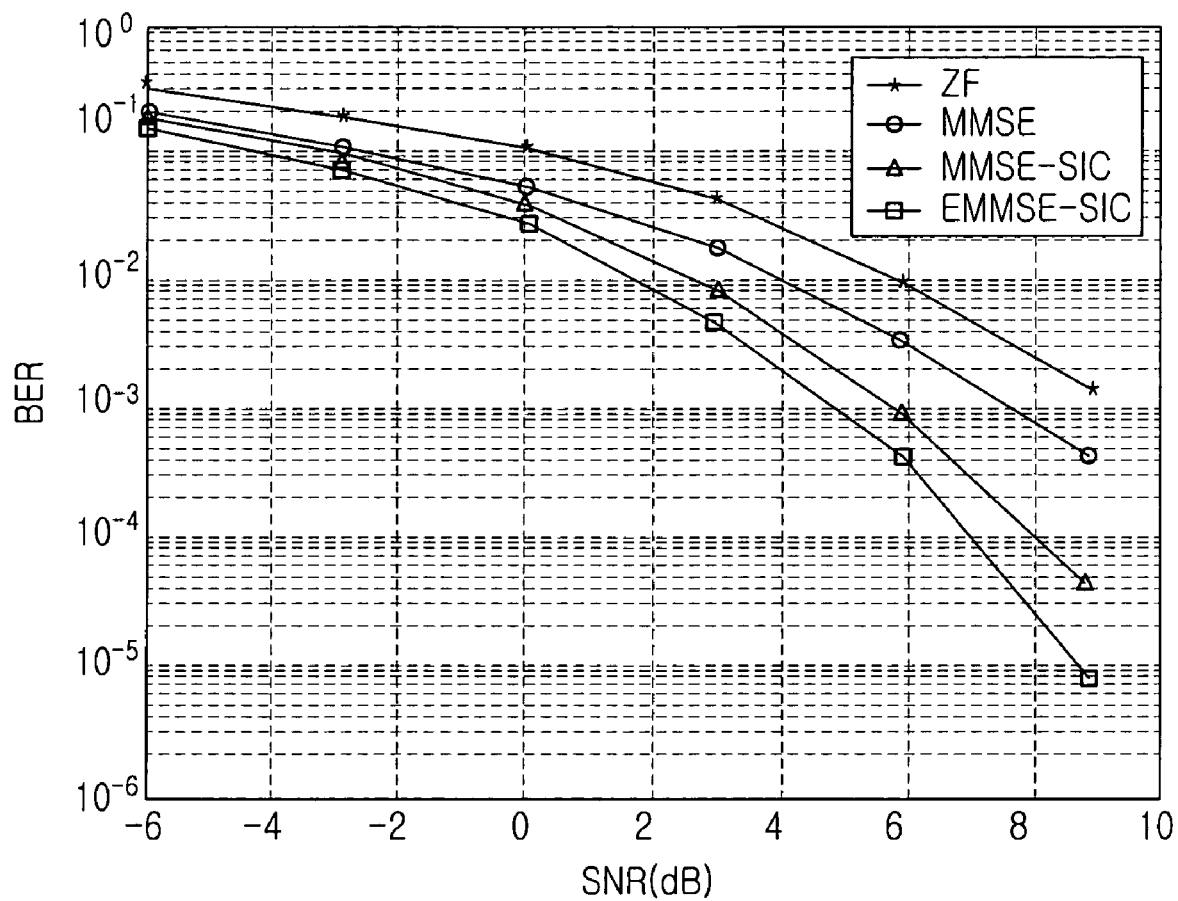
FIG. 5 is a graph comparing the performance of a conventional signal receiving method and the signal receiving method according to an embodiment of the present invention, for Binary Phase Shift Keying (BPSK)
Figure 6:
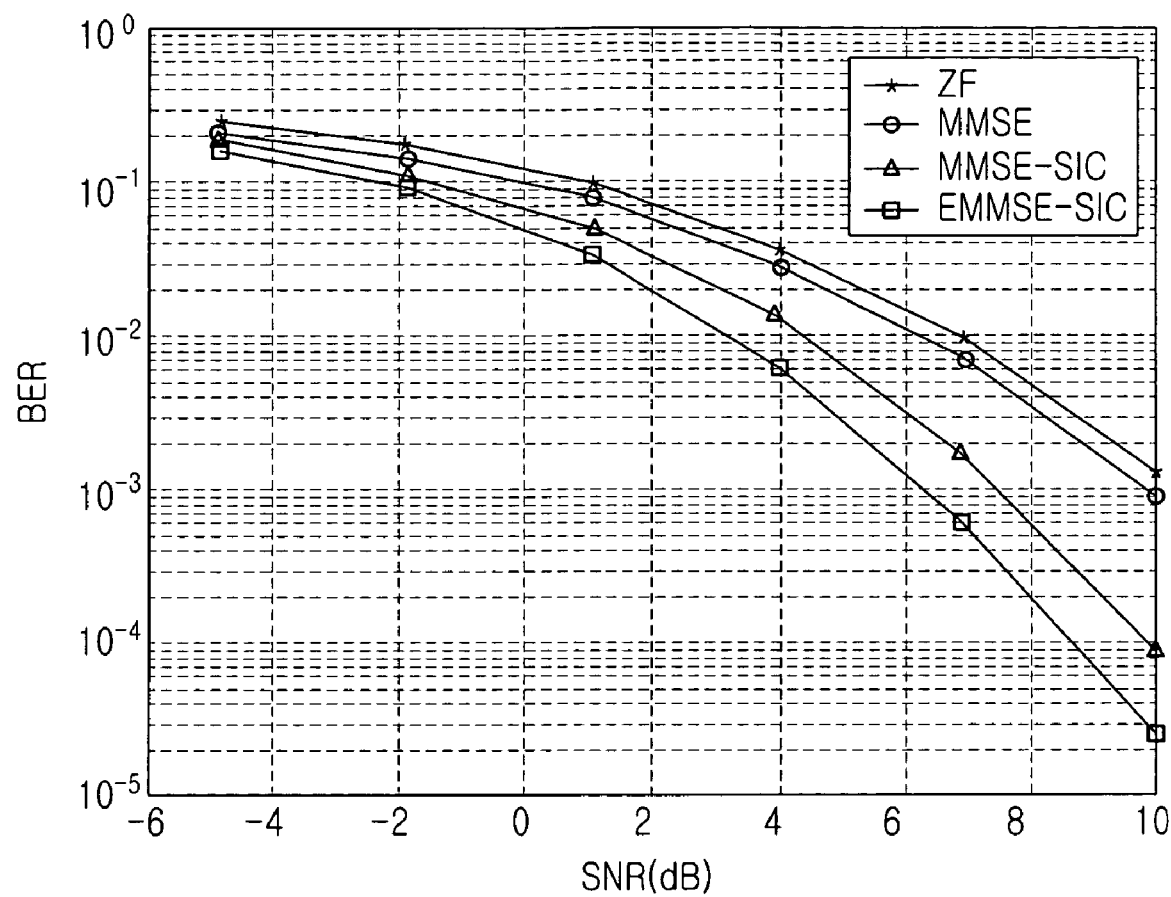
FIG. 6 is a graph comparing in performance the conventional signal receiving method and the signal receiving method according to an embodiment of the present invention, for Quadrature Phase Shift Keying (QPSK).

The signal reception of an embodiment of the present invention will be compared with typical signal receptions in terms of performance with reference to FIGS. 5 and 6.

FIG. 5 is a graph illustrating the performance of the signal reception method according to an embodiment of the present invention and conventional signal reception methods in the case of BPSK.

Referring to FIG. 5, the performance is measured in Bit Error Rate (BER). For the simulation, it is assumed that the channel environment is a frequency-selective fading channel environment with four signal paths (L=4), the number of transmit and receive antennas is given to be N, the spreading factor of spreading codes is 16 (SF=16), the number of oversamples per chip is 2 (P=2), and the number of the spreading codes is 8 (J=8).

It is shown that the enhanced MMSE-SIC (EMMSE-SIC) according to an embodiment of the present invention has the best BER performance, followed by MMSE-SIC, MMSE and SF in this order.

FIG. 6 is a graph illustrating the performance of the signal reception method according to an embodiment of the present invention and the conventional signal reception methods in the case of QPSK.

Referring to FIG. 6, the performances are compared in BER. For the simulation, it is assumed performed that the channel environment is a frequency-selective fading channel environment with four signal paths (L=4), the number of transmit and receive antennas is given to be N, the spreading factor of spreading codes is 16 (SF=16), the number of oversamples per chip is 2 (P=2), and the number of the spreading codes is 8 (J=8).

It is shown that the enhanced MMSE-SIC (EMMSE-SIC) of an embodiment of the present invention has the best BER performance, followed by MMSE-SIC, MMSE and SF in this order.

In accordance with an embodiment of the present invention as described above, the receiver in the MIMO communication system verifies errors in a transmit antenna signal to be cancelled as an interference signal in application of the MMSE-SIC scheme, thereby increasing the demodulation reliability of a received signal. That is, after the reliability of a transmit antenna signal with the highest SINR is ensured, it is cancelled as an interference signal. Therefore, the error probability of a typical MMSE-SIC scheme is minimized, thus enabling reliable signal transmission and reception.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of receiving a signal from a transmitter through a plurality of transmit antennas in a receiver with a plurality of receive antennas in a multiple-input multiple-output (MIMO) communication system, comprising the steps of:
   (1) equalizing a first received signal received at each of the receive antennas in a predetermined first method and classifying the equalized signals into respective transmit antenna signals;
   (2) despreading each of the equalized transmit antenna signals with a plurality of spreading codes used in the transmitter;
   (3) detecting the strongest transmit antenna signal among the despread transmit antenna signals, and verifying errors in the strongest transmit antenna signal by decoding the strongest transmit antenna signal in a predetermined second method;
   (4) reproducing the verified strongest transmit antenna signal as an interference signal;
   (5) generating a second received signal by subtracting the interference signal from the first received signal;
   (6) equalizing the second received signal in the predetermined first method and classifying the equalized signals into respective transmit antenna signals except the strongest transmit antenna signal; and
   (7) repeating steps (2) through (6) until all of the received signals have been equalized.

2. The method of claim 1, wherein the strongest transmit antenna signal is a transmit antenna signal having the highest signal to interference and noise ratio (S1NR).

3. The method of claim 1, wherein the first method is a minimum mean square error (MMSE) method.

4. The method of claim 1, wherein the second method is maximum likelihood (ML) decoding.

5. An apparatus for receiving a signal from a transmitter through a plurality of transmit antennas in a receiver with a plurality of receive antennas in a multiple-input multiple-output (MIMO) communication system, comprising:
   a receiver for equalizing a first received signal received at each of the receive antennas in a predetermined first method, classifying the equalized signals into respective transmit antenna signals, equalizing a second received signal generated under a predetermined control in the first method, and classifying the equalized signals into respective transmit antenna signals except the strongest transmit antenna signal;

a plurality of despreaders for despreading each of the transmit antenna signals with a plurality of spreading codes used in the transmitter;

an error verifier for detecting the strongest transmit antenna signal among the despread transmit antenna signals, and verifying errors in the strongest transmit antenna signal by decoding the strongest transmit antenna signal in a predetermined second method;

a signal reproducer for reproducing the verified strongest transmit antenna signal as an interference signal; and a plurality of subtractors for generating the second received signal by subtracting the interference signal from the first received signal.

6. The apparatus of claim 5, wherein the strongest transmit antenna signal is a transmit antenna signal having the highest signal to interference and noise ratio (S1NR).

7. The apparatus of claim 5, wherein the first method is a minimum mean square error (MMSE) method.

8. The apparatus of claim 5, wherein the second method is maximum likelihood (ML) decoding.

9. The apparatus of claim 5, further comprising a plurality of multiplexers for multiplexing the despread signals received from the despreaders and outputting the multiplexed signals to the error verifier.

* * * * *